(12) United States Patent
Thomas (10) Patent No.: US 11,125,955 B1
(45) Date of Patent: Sep. 21, 2021

(54) MULTI-FIBER PUSH-ON ADAPTER FOR A CRYOGENIC LASER TRANSMITTER

(71) Applicant: Raytheon Company, Waltham, MA (US)

(72) Inventor: Matthew Thomas, Carpinteria, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/887,432

(22) Filed: May 29, 2020

(51) Int. Cl.
*G02B 6/42* (2006.01)
*H04B 10/40* (2013.01)
*H04B 10/2581* (2013.01)

(52) U.S. Cl.
CPC .......... *G02B 6/4249* (2013.01); *G02B 6/421* (2013.01); *G02B 6/4256* (2013.01); *G02B 6/4268* (2013.01); *G02B 6/4278* (2013.01); *H04B 10/2581* (2013.01); *H04B 10/40* (2013.01)

(58) Field of Classification Search
CPC .. G02B 6/4249; G02B 6/4278; G02B 6/4256; G02B 6/4268; G02B 6/421; H04B 10/40; H04B 10/2581
See application file for complete search history.

(56) References Cited

U.S. PATENT DOCUMENTS

| | | | |
|---|---|---|---|
| 6,078,356 A | 6/2000 | Jensen | |
| 6,712,527 B1 | 3/2004 | Benson et al. | |
| 9,977,202 B2 | 5/2018 | Musk | |
| 10,054,749 B1 | 8/2018 | Wang et al. | |
| 10,302,529 B2 * | 5/2019 | Schell | G02B 6/42 |
| 10,355,783 B2 | 7/2019 | Heimbuch | |
| 10,374,700 B2 * | 8/2019 | Schell | G01M 11/35 |
| 10,541,747 B2 * | 1/2020 | Schell | G01M 11/30 |
| 10,884,105 B2 * | 1/2021 | Jenkins | G02B 6/42 |
| 2011/0091207 A1 | 4/2011 | Chuan et al. | |
| 2019/0369213 A1 * | 12/2019 | Jenkins | G01S 7/4818 |

FOREIGN PATENT DOCUMENTS

KR 20080088723 A 10/2008

OTHER PUBLICATIONS

Prizm LightTurn Solutions, retrieved from https://www.usconec.com/files/literature/Prizm_LightTurn_Connector.pdf, 2020.
17813, Mechanical Optical Interface (MOI) 25+ Gbps, Prizm LightTurn retrieved from https://www.usconec.com/products/mechanical-optical-interface-moi-25plus-gbps-prizm-lightturn, 2020.
International Search Report and Written Opinion for International Application No. PCT/US2021/023281 dated Jun. 17, 2021.

* cited by examiner

*Primary Examiner* — Andrew Jordan
(74) *Attorney, Agent, or Firm* — Burns & Levinson, LLP; Joseph M. Maraia (57) ABSTRACT

A cryogenic laser transmitter includes a multi-fiber push-on (MPO) fiber adapter. The MPO fiber adapter includes an adapter housing and a laser mount. The adapter housing contains a plurality of laser diodes, each laser diode configured to generate a laser emission based on an input signal of a focal plane array. The laser mount is configured to mate with an MPO connector and direct each laser emission through to a corresponding fiber core of the MPO connector.

17 Claims, 8 Drawing Sheets

MULTI-FIBER PUSH-ON ADAPTER FOR A CRYOGENIC LASER TRANSMITTER

FIELD OF THE TECHNOLOGY

The subject disclosure relates to laser transmitters particularly to cryogenic laser transmitters.

BACKGROUND OF TECHNOLOGY

High-bandwidth cryogenic focal plane array modules often employ high bandwidth rigid flex cables. These cables use conductors which conduct heat from warm dewar connectors to the cryogenic focal plane, forcing the system to use more power to cool the focal plane. The assemblies of flex cables can be made longer to reduce conductance, but this requires more focal plane driver current, which also adds heat to the focal plane. Further, inaccuracies arise because the electrical signals in the flex cables are susceptible to cross talk and electromagnetic interference.

To combat the problems discussed above, photonic technologies such as ring or disk modulators have been driven with focal plane outputs to convert electrical signals to photonic signals, but this requires laser narrow-band light coupled into polarization-maintaining single mode fibers. Given differences in coefficients of thermal expansion between the fiber mounts and modulators, it can be difficult to keep fibers, which can have 9 micrometer core diameters, aligned with modulator(s) at cryogenic temperatures. Thus, the approach of using photonic rings or disk modulators can be difficult and expensive to integrate with an existing cryogenic focal plane module, especially if multiple modulator assemblies are needed for multiple focal plane outputs.

Therefore there is a need for a device which effectively transmits signals from a focal plane array within a dewar while also limiting heat transfer to the focal plane array, while doing so with excellent performance from room temperature to cryogenic temperatures and enabling quick and simple fiber connection and disconnection techniques.

SUMMARY OF THE TECHNOLOGY

In light of the needs described above, in at least one aspect, the subject technology relates to an adapter which can be easily integrated within an existing cryogenic laser transmitter and provides a signal to the cryogenic focal plane while de-coupling the cryogenic focal plane from conductive electrical cables.

In at least one aspect, the subject technology relates to a multi-fiber push-on (MPO) fiber adapter having an adapter housing and laser mount. The adapter housing contains a plurality of laser diodes, each laser diode configured to generate a laser based on an input signal of a focal plane array high speed output. The laser mount is configured to mate with an MPO connector having a plurality of fiber cores and direct each laser through to a corresponding fiber core of the MPO connector.

In some embodiments, each laser diode is mounted in a location on the laser mount for directing the laser emissions (from the laser emitting diodes) into the corresponding fiber cores of the MPO connector. Each laser is spaced a first distance from adjacent lasers, the first distance equal to second distance between fiber cores of the MPO connector (i.e. the second distance being between any fiber core of the MPO connector, not necessarily adjacent fiber cores). In some cases, the laser mount includes a first pin hole proximate a first edge and a second pin hole proximate a second edge opposite the first edge. The first pin hole is positioned to align with a first guide pin of the MPO connector and the second pin hole is positioned to align with a second guide pin on the MPO connector to align the MPO fiber adapter and the MPO connector. The laser mount can include a plurality of lasers located between the first pin hole and the second pin hole, each laser location configured to direct one of the laser diodes to the corresponding fiber core of the MPO connector.

In at least one aspect, the subject technology relates to a cryogenic laser transmitter having a focal plane array, a cryogenic dewar, an MPO connector, and an MPO adapter. The cryogenic dewar contains the focal plane array and is configured to cryogenically cool the focal plane array. The MPO connector contains a plurality of fiber core. The MPO fiber adapter is connected between the MPO connector and the focal plane array. The MPO fiber adapter includes an adapter housing containing a plurality of laser diodes, each laser diode configured to generate a laser emission based on an input signal from the focal plane array. The MPO fiber adapter also includes a laser mount configured to mate with the MPO connector and direct each laser emission to a corresponding fiber core of the MPO connector. The focal plane array can be a digital focal plane array, with the output video signals transmitted using digital formats, or the focal plane array can have analog focal plane array video outputs—though in the latter case the laser power versus input voltage will need to be calibrated as a function of temperature and voltage.

In some embodiments, each laser diode is mounted in a location for directing the laser emission into the corresponding fiber core of the MPO connector. Each laser is spaced a first distance from adjacent lasers, the first distance being equal to a second distance between fiber cores of the MPO connector. In some cases, the laser mount includes a first pin hole proximate a first edge and a second pin hole proximate a second edge opposite the first edge. The first pin hole is positioned to align with a first guide pin of the MPO connector and the second pin hole is positioned to align with a second guide pin on the MPO connector to align the MPO fiber adapter and the MPO connector. The laser mount can include a plurality of laser locations between the first pin hole and the second pin hole, each laser location configured to direct the laser emissions into the corresponding fibers of the MPO connector. In some embodiments, the plurality of laser diodes include 6 separate laser diodes and the MPO connector includes 12 fibers, including 6 fibers aligning with the 6 separate laser diodes.

In some embodiments, the plurality of fiber cores are multimode fiber cores having a core diameter of substantially 50 micrometers. In some embodiments, the plurality of fiber cores are multimode fiber cores having a core diameter of substantially 62 micrometers. In some cases, each laser diode includes a circuit card with a bonding pad, the bonding pad configured to connect to a power source of the focal plane array to power said laser diode. In some embodiments, each laser diode is configured to operate at greater than 2 Gbps to transmit data from the input signal. In some embodiments, the laser diodes are Fabry-Perot lasers.

In some embodiments, the laser mount material is formed from a material with a thermal coefficient of expansion substantially between 20E-6 mm/mm/K and 90E-6 mm/mm/K. In some cases the laser mount material is aluminum.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

The subject technology overcomes many of the prior art problems associated with cryogenic focal plane array systems. In brief summary, the subject technology provides an adapter that can be integrated into an existing cryogenic focal plane array system. The adapter includes a number of laser diodes which receive electrical inputs from a focal plane and generate laser outputs. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Figure 1:
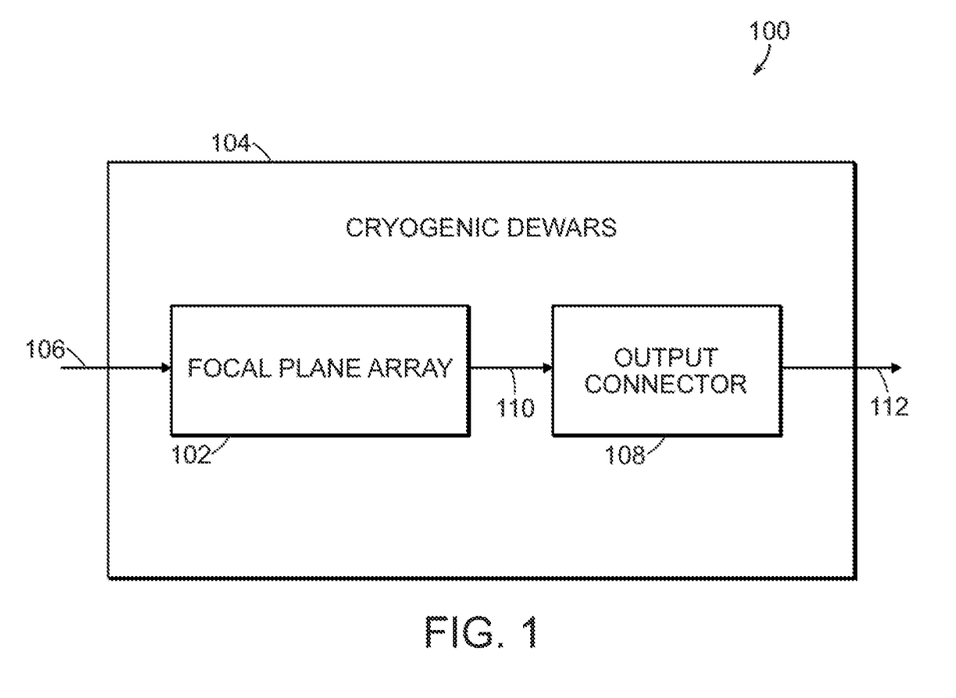
FIG. 1 is a block diagram of a cryogenic laser transmitter in accordance with the subject technology.

Referring now to FIG. 1, an exemplary block diagram of a cryogenic laser transmitter 100 is shown. A focal plane array 102 is positioned within a cryogenic dewar 104. The cryogenic dewar 104 forms a vacuum enclosure and cools the focal plane array 102 to cryogenic temperatures using liquid nitrogen or other coolant. The focal plane array 102 can be used for infrared camera applications, with the cryogenic dewar 104 cooling the focal plane array 102 to below 280 Kelvin. In some cases the focal plane array 102 can be cooled to between 80-120 Kelvin, while in some cases the focal plane array 102 can be cooled to substantially about 45 Kelvin.

Electrical cables 106 connect to the focal plane array 102 to provide electrical input, such as power. Further, an output connector 108 attaches to the focal plane array 102. In some cryogenic laser transmitters, the output connector 108 is an electrical cable. In such a case, a video signal 110 (i.e. digital signal) is transferred from the focal plane array 102 to the output connector 108 which transfers a digital output signal 112 out of the cryogenic dewar 104. However, using electrical cables as an output connector 108 suffers from many disadvantages, as discussed herein. Thus, the output connector 108 of the subject application converts the video signal 110 from the focal plane array to a photonic signal and provides a photonic output signal 112, as will be discussed in more detail below.

Figure 2:
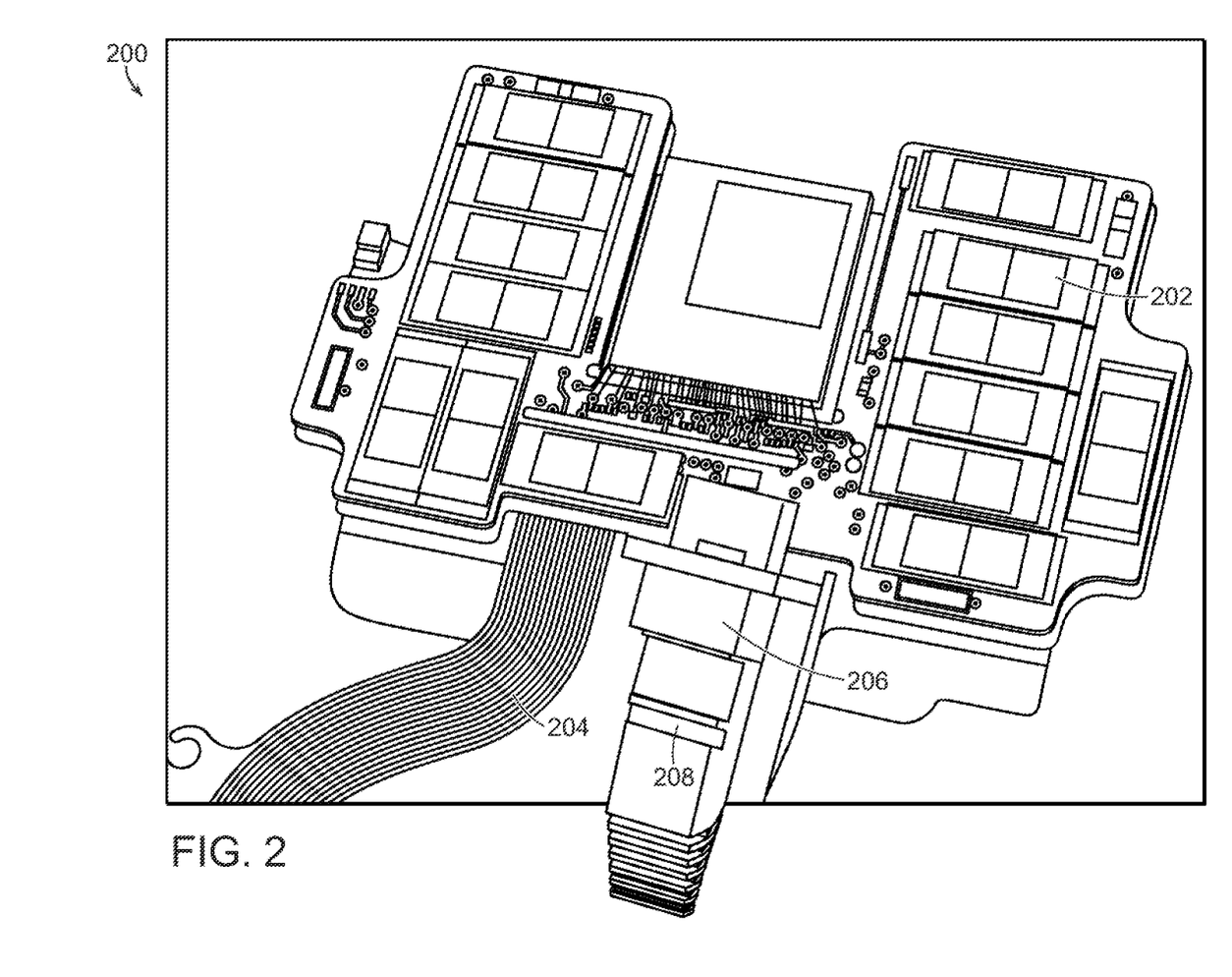
FIG. 2 is a perspective view of components of a cryogenic laser transmitter in accordance with the subject technology.

Referring now to FIG. 2, a perspective view of a cryogenic laser transmitter 200 in accordance with the subject technology is shown. The cryogenic laser transmitter 200 can function in similarly to the cryogenic laser transmitter 100, except as otherwise shown and described herein. The cryogenic laser transmitter 200 includes a focal plane array 202 within a cryogenic dewar (not shown). In some cases, the focal plane array 202 can be a digital focal plane array providing a digital output signal. A ribbon cable 204 connects camera electronics to the focal plane array 202. A multi-fiber push-on (MPO) fiber adapter 206 also connects an MPO connector 208 (or another similar multichannel optical fiber connector type) to the focal plane array 202. The connection between the MPO connector 208 and the MPO fiber adapter 206 is discussed in more detail herein. In general, the MPO connector 208 can be a typical MPO connector 208 containing a number of fiber cores, as are known in the art. The MPO fiber adapter 206 contains a number of laser diodes and is particularly configured to connect to the focal plane array 202 and transmit output lasers to the fibers of the MPO connector 208.

Figure 3:
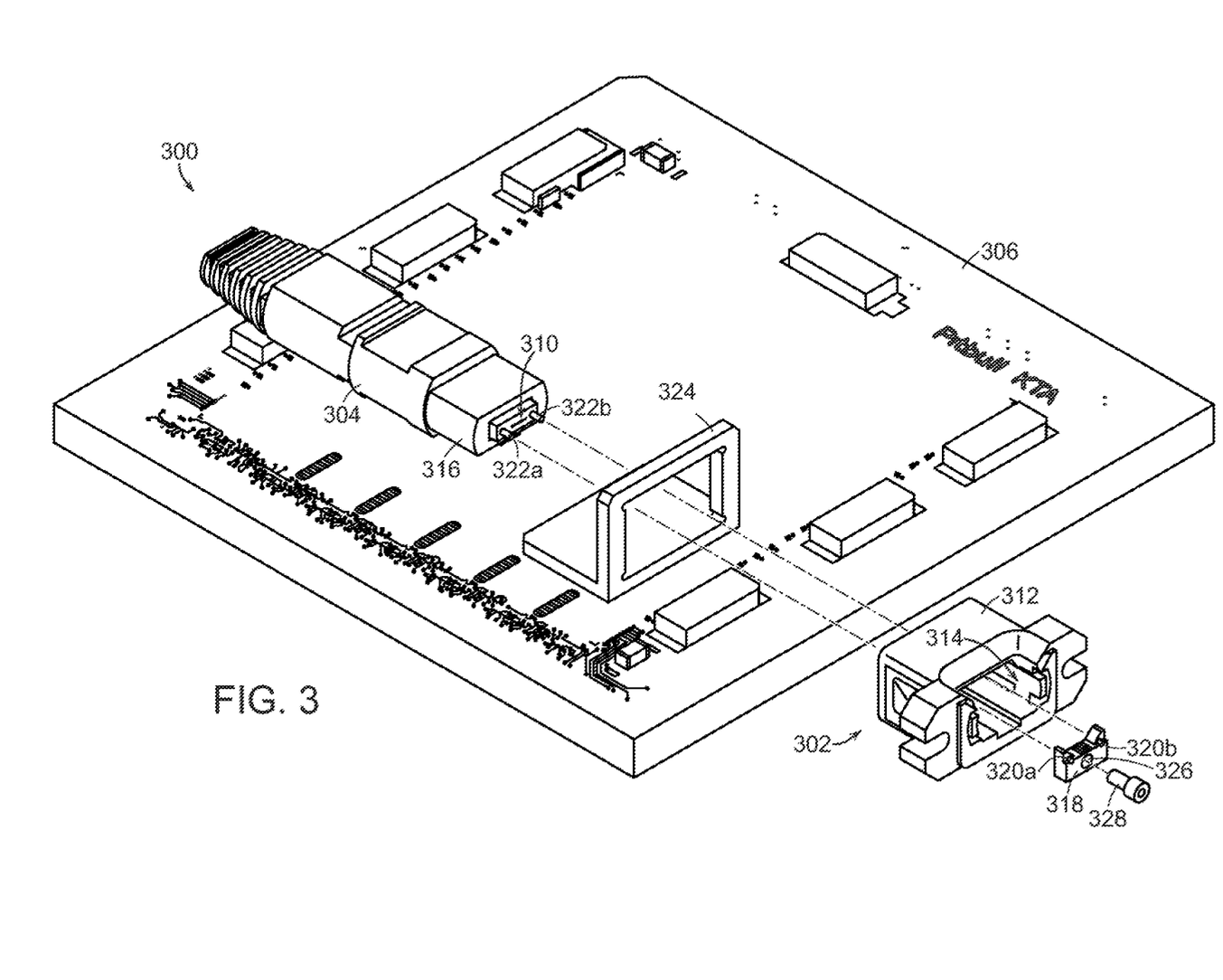
FIG. 3 is an exploded view of components of a cryogenic laser transmitter in accordance with the subject technology arranged on a test board.
Figure 4:
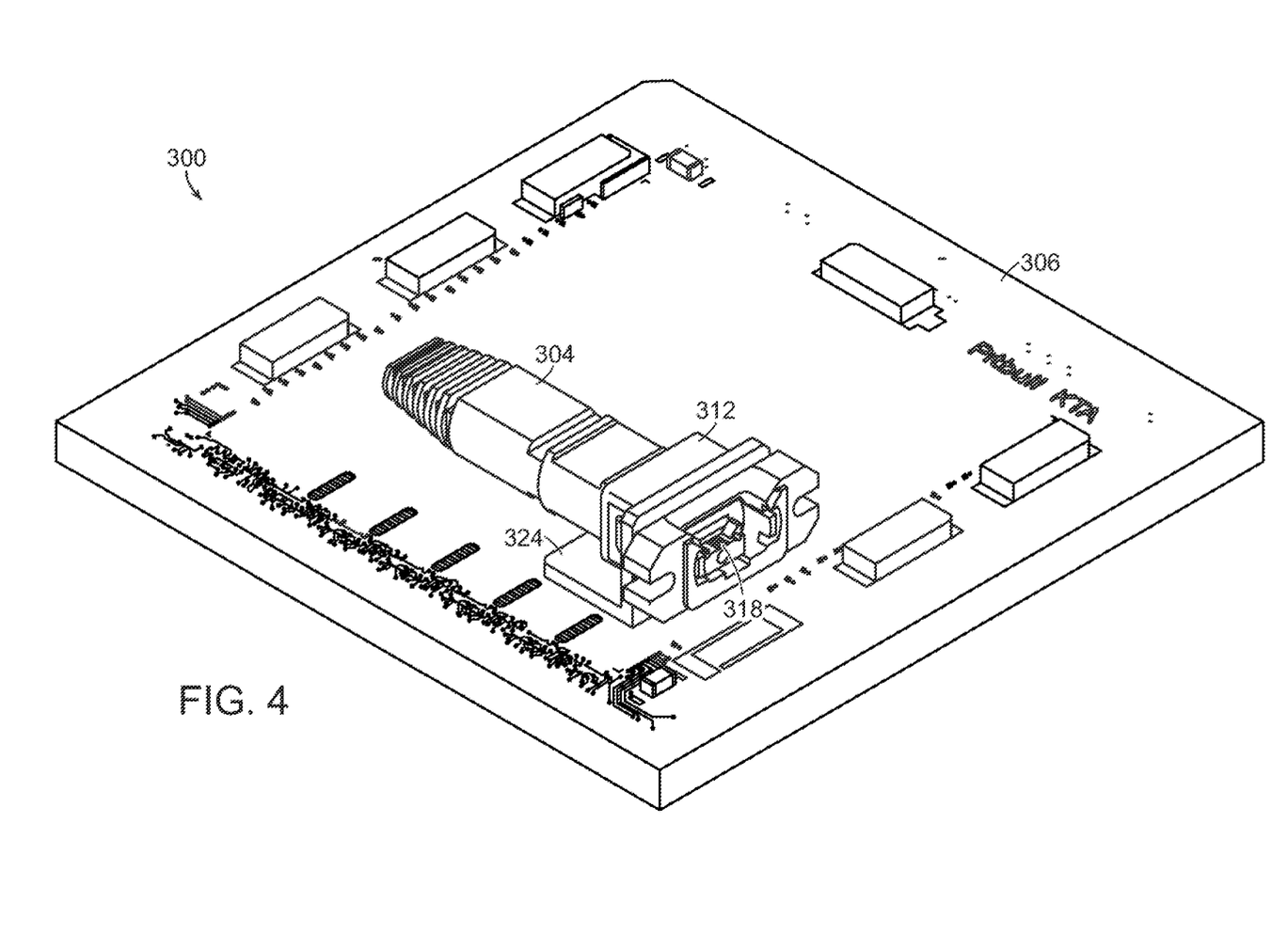
FIG. 4 is a perspective view of the cryogenic laser transmitter components and test board of FIG. 3.
Figure 5:
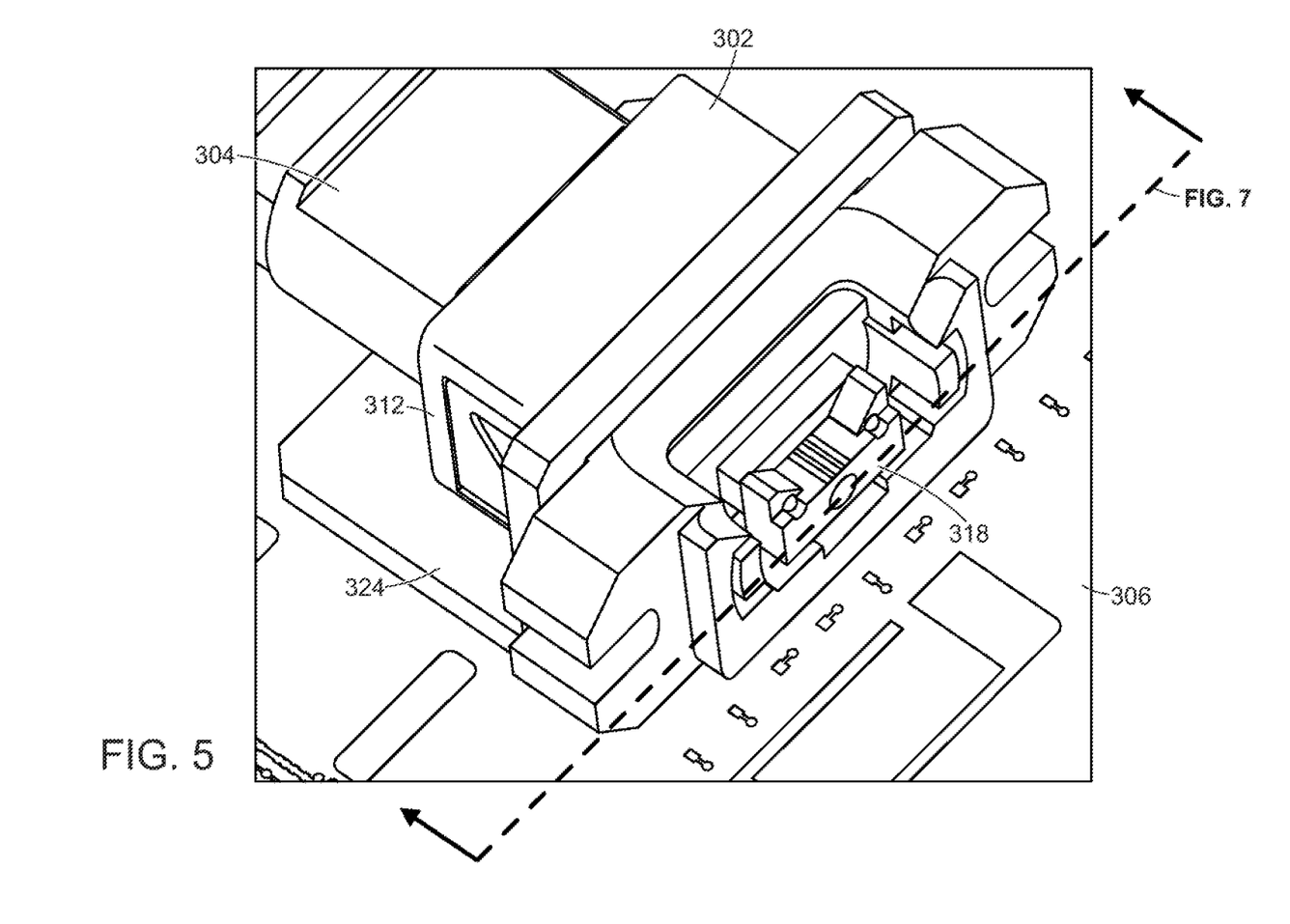
FIG. 5 is a zoomed in perspective view of the multi-fiber push-on (MPO) fiber adapter of the cryogenic laser transmitter of FIG. 4.
Figure 6:
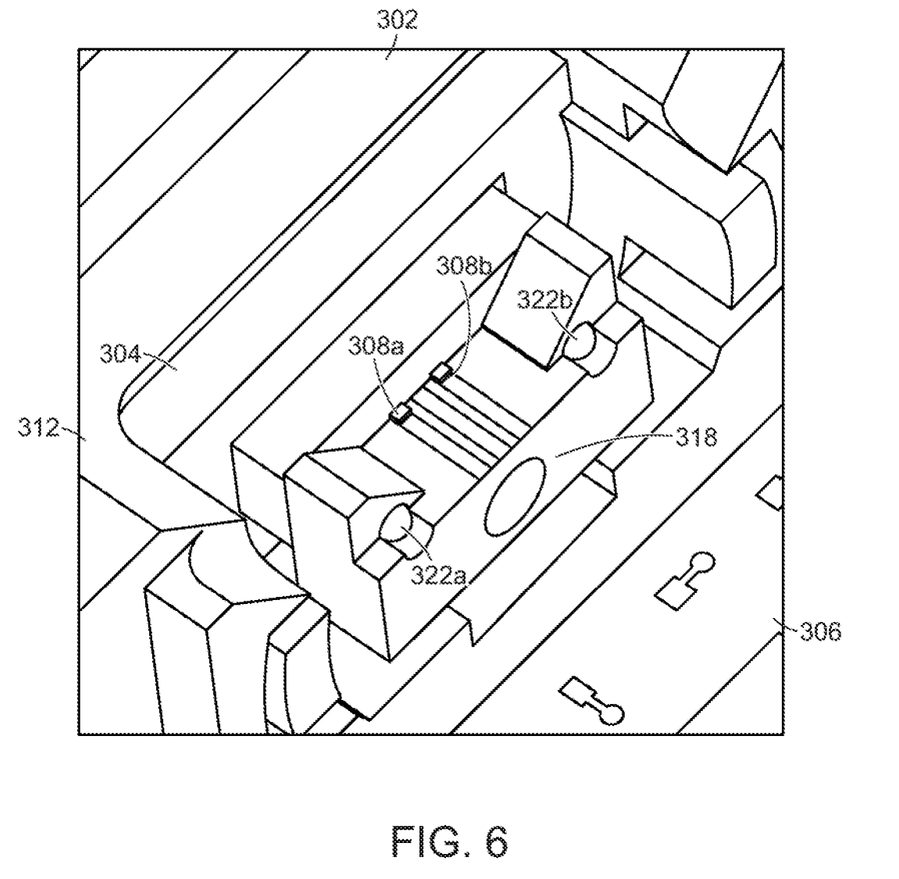
FIG. 6 is a further zoomed in perspective view of the MPO fiber adapter of FIG. 5.
Figure 7:
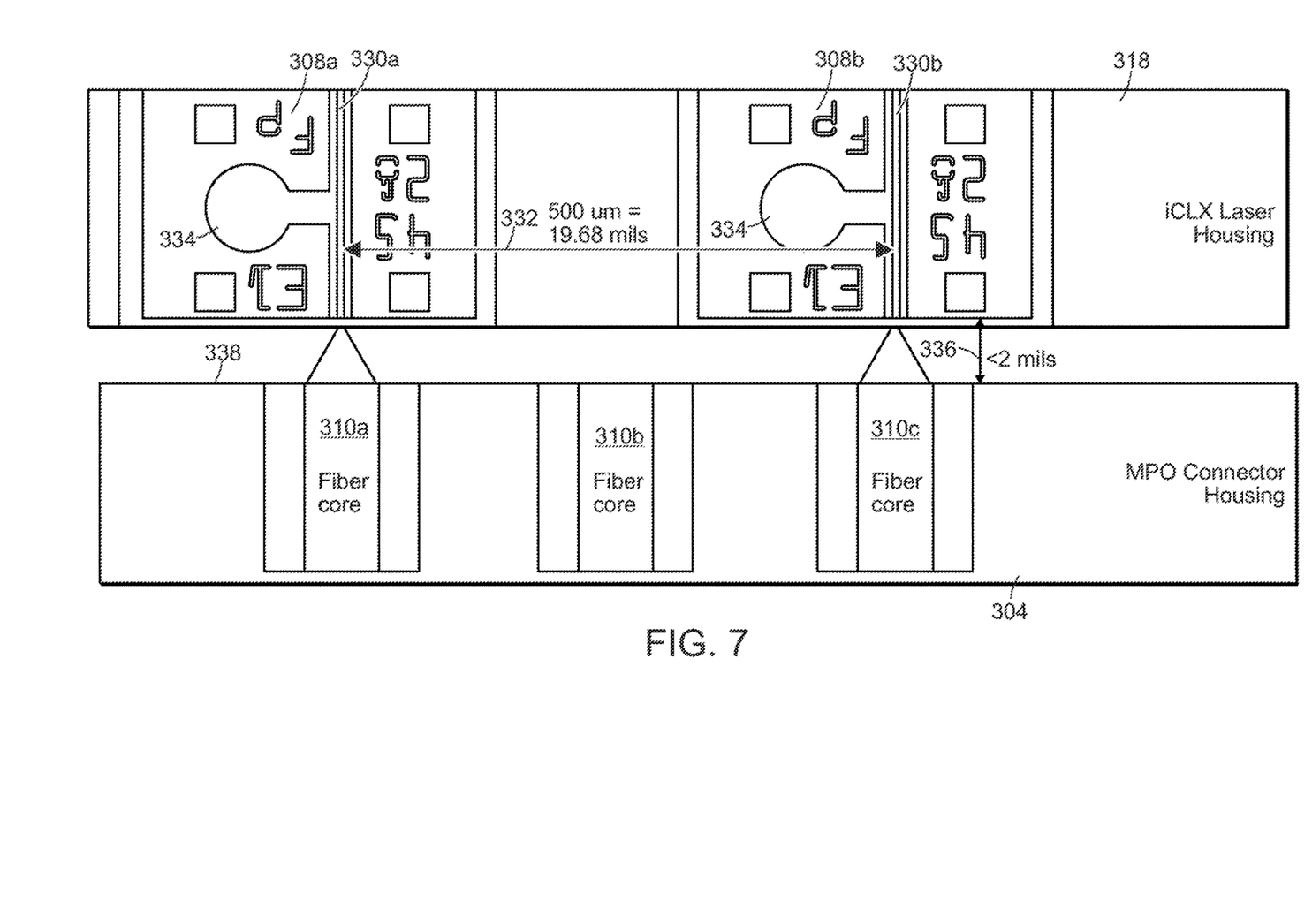
FIG. 7 is an overhead sectional view of the MPO connector and MPO fiber adapter of FIGS. 4-6.

Referring now to FIGS. 3-7, a cryogenic laser transmitter test setup 300 is shown which includes an MPO fiber adapter 302 and MPO connector 304 in accordance with the subject technology. In particular, FIG. 3 shows an exploded view of a test board 306, an MPO fiber adapter 302, and MPO connecter 304 in accordance with the subject technology, including associated components. FIGS. 4-6 are perspective views of the MPO fiber adapter 302 and MPO connecter 304 assembled on the exemplary test board 306. FIG. 7 is a cross sectional view taken horizontally through roughly the center of the MPO fiber adapter 302 and MPO connector 304.

In general, the MPO fiber adapter 302 has a plurality of laser diodes 308a, 308b (generally 308) which are connected to a focal plane and configured to emit a laser which is transmitted to corresponding fibers 310 within the MPO connector 304. Thus, the MPO fiber adapter 302 is designed to connect to the MPO connector 304 in a way that ensures the lasers align with fibers of the MPO connector 304.

The MPO fiber adapter 302 has a housing component 312 with a generally hollow center 314 which is designed to encompass a protruding end 316 of the MPO connector 304. The MPO fiber adapter 302 also includes a laser mount 318 which includes a first pin hole 320a proximate one edge of the laser mount 318 and a second pin hole 320b proximate a second edge of the laser mount 318. The MPO connector 304 includes guide pins 322a, 322b which correspond to the pin holes 320a, 320b of the MPO fiber adapter 302. Thus, when connecting the MPO connector 304 and adapter 302, the guide pins 322a, 322b are positioned within the guide pin holes 320a, 320b. The end 316 of the MPO connector 304 can then slide into the MPO fiber adapter housing 312, with the guide pins 322a, 322b and guide pins holes 320a, 320b guiding the MPO connector 304 and MPO fiber adapter 302 (and particularly the laser diodes 308 and the fibers 310) into proper alignment. In the example given, a bracket 324 is also included to hold the MPO connector 304 and MPO fiber adapter 302 securely together once connected. Similarly, other mechanical fixation devices as are known in the art can be included to help secure the connection between the various components shown herein, but are not strictly necessary. For example, as shown in FIG. 3, laser mount 318 can include a bore hole 326 which be used to can secure the MPO fiber laser mount 318 to the adapter housing 312 via a screw 328. The screw 328 also can provide an electrical connection to cathodes (i.e. negative voltage leads) or anodes of the laser diodes 308.

As best seen in FIG. 7, each laser diode 308 includes a laser location 330a, 330b (generally 330) above the active region which, when the MPO connector 304 and MPO fiber adapter 302 are coupled together, aligns with a corresponding fiber core 310a, 310c of the MPO connector 304. In the example shown, the first laser diode 308a includes a laser emitting location 330a which aligns with the first fiber core 310a shown, while a second laser diode 308b includes a laser emitting location 330b which aligns the laser of the second diode 308b with the third fiber core 310c. The laser locations 330a, 330b are channels, cavities, or the like, of the laser diodes which emit the light of the associated laser diodes 308a, 308b into respective fiber cores 310a, 310c. The middle fiber 310b is effectively skipped, and not aligned with any laser diode 308 to maintain a spacing distance 332 between the laser diodes 308a, 308b. Aligning laser diodes 308 with every other fiber core 310a, 310b, 310c (generally 310) has been found to help keep a proper spacing and alignment. While different spacing distances 332 can be used in different embodiments, it has been found advantageous to provide a spacing distance 332 of 500 micrometers, or of substantially (i.e. +/−10 percent) 500 micrometers (i.e. +/−10 percent) since that is the spacing of two fibers in the standard MPO connector. Further, using multimode fiber cores 310 with core diameters of substantially 62 micrometers has been found to be provide a good alignment margin between the laser diodes 308 and fiber cores 310. When the MPO fiber adapter 302 is connected to the MPO connector 304, the laser diodes 308 can each have a spacing distance 336 of less than 2 mils (milli-inches) from a front face 338 of the MPO connector 304 to enable most of the laser light to transfer into the fiber cores.

Notably the MPO connector 304 can be any type of mated standard MPO connector. Different connectors with a different number of fiber cores 310 can be used in accordance with the subject technology, however exemplary MPO connectors that have been found to be advantageous are shown and described herein. FIG. 7 is provided to show an example of how two laser diodes 308 align with two corresponding fiber cores 310 of the MPO connector 304. Yet other numbers of laser diodes 308 could also be used. In some arrangements, the MPO connector 304 will have 12 fiber cores 310. In such a case, it has been found advantageous to include 6 total laser diodes 308, each laser diode 308 positioned to align with a corresponding one of the 12 fiber cores 310 in the MPO connector 304. However, in other cases, smaller laser diodes 308 could be used and a laser diode 308 could be positioned to align with every fiber core 310 of the MPO connector 304. The use of the laser diodes 308 aligned to the fiber cores 310 in an MPO connector 304 that provides a reproducible interface allows the MPO fiber adapter 302 to be easily disconnected and reconnected, in contrast to photonic modulators which are required to have fiber cores 310 fastened in place, typically with epoxy.

Each laser diode 308 can include a small circuit card with a bonding pad 334. The bonding pads 334 allow the laser diodes 308 to be easily connected to the focal plane array to drive the laser diodes 308. For example, each laser diode 308 can be configured to connect to a standard power source from the focal plane array, such as 1.8 VDC, using a small bias tee and a voltage divider to properly drive the laser diodes 308 in their linear range. It has been found to be particularly advantageous to use a laser diode 308 that operates at greater than 2 Gbps to transmit data from an external source, such as the focal plane array, between room temperature and cryogenic temperatures. While various types of laser diodes 308 may be used in some cases, as are known in the art, Fabry-Perot laser diodes 308 have been found to be particularly effective.

The thermal coefficient of expansion between the parts of the system can be designed to minimize varying thermal expansion between the parts and keep coupling losses to a minimum. In particular, in order to keep the coupling losses due to thermal expansion to less than 1 dB, the laser mount 318 can be formed from a material with a thermal coefficient of expansion between 20E-6 mm/mm/K and 90E-6 mm/mm/K. This limits the spatial shifts between the laser mount 318, MPO housing 312 (which houses the lasers 308 and fibers 310 when connected to the MPO connector 304) and MPO connector 304 to less than 10 micrometers when cooling the laser transmitter from 300 K to 80 K. Therefore aluminum is an acceptable laser mount 318 material, while Al2O3 does not work as well for the high-expansion materials typically making up the MPO adapters.

Figure 8:
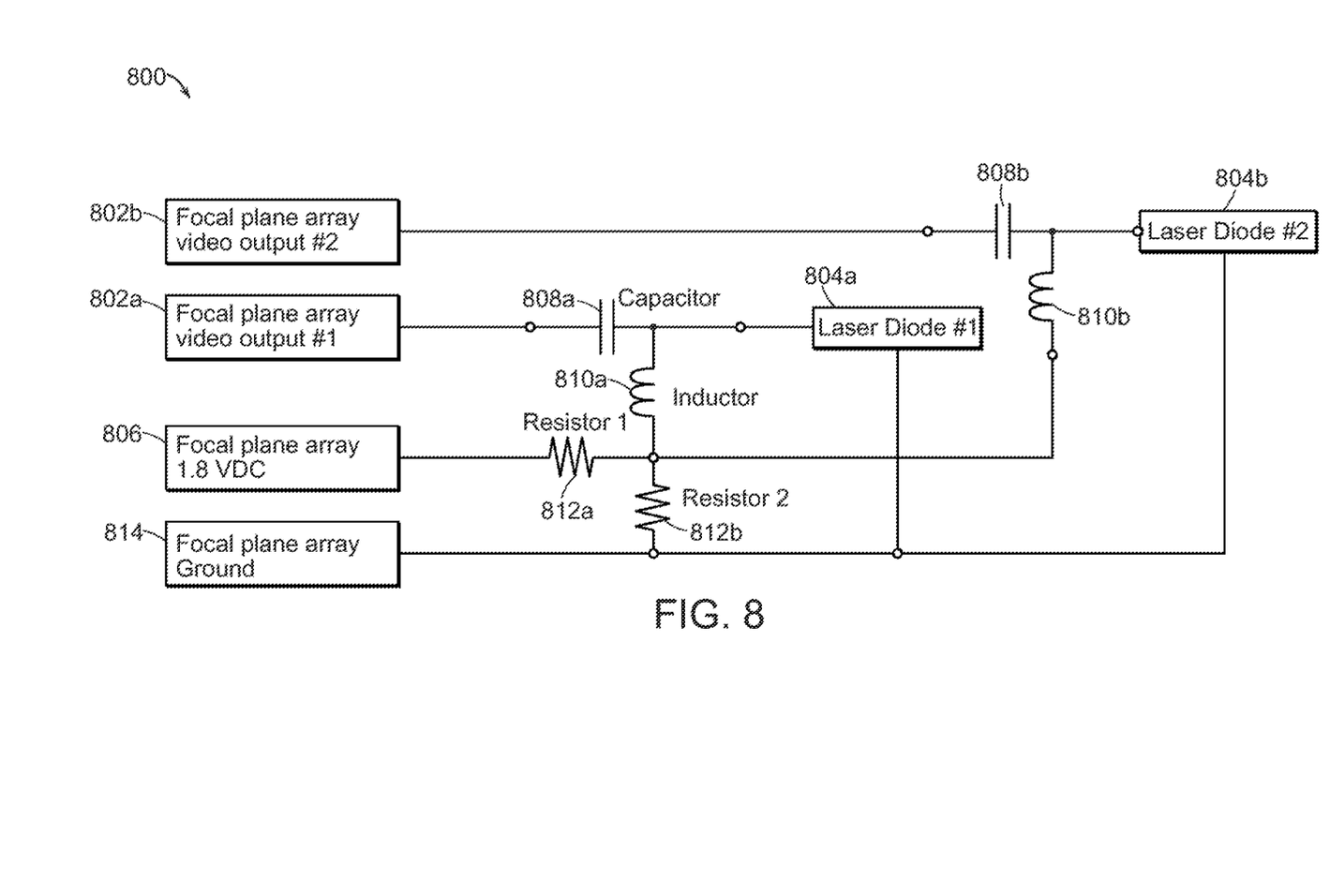
FIG. 8 is an exemplary electrical schematic diagram of a cryogenic laser transmitter in accordance with the subject technology.

Referring now to FIG. 8, an electrical schematic diagram 800 of an exemplary cryogenic laser transmitter in accordance with the subject technology is shown. It should be understood that the electrical diagram 800 is provided to show and describe a possible electrical configuration of a laser transmitter in accordance with the subject technology. The diagram 800 is provided only by way of example and the amount and exact configuration of the components shown therein may vary as would be understood by one of skill in the art.

In the diagram 800, the focal plane array includes two video outputs 802a, 802b, each with a corresponding laser diode 804a, 084b which can be located within an adapter housing of an MPO fiber adapter. A power source 806 from the focal plane is included, which can be a 1.8 VDC power source 806. The system is electrically configured to use a voltage divider and bias tee to provide a signal and power to the laser diodes 804a, 804b. In one example, a 0.1 to 5 GHz signal and 1 VDC power can be provided at each laser diode 804a, 804b. The capacitors 808a, 808b can then have a capacitance of 100 pF and the inductors 810a, 810b can have an inductance of 1 uH. The first resistor 812a can have a resistance of 180 ohms, while the second resistor 812b can have a resistance of 20,000 ohms. Notably, these values are given by way of example only. The system is also connected to an electrical ground 814.

In general, the cryogenic laser transmitter described herein eliminates the need for electrical cables to transfer the digital focal plane signals or clocks from the cryogenic platform to the warmer dewar housing, thereby reducing the thermal conductivity from the dewar housing to the cryogenic platform, allowing the system to run at higher data rates (e.g. 4 Gbps), and eliminating electromagnetic interference and cross talk. Further, the system described allows for simple integration with an existing focal plane without the drawbacks of other photonic systems which are vulnerable to differences in coefficients of thermal expansion and fiber breakage or bulky mounting techniques.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A multi-fiber push-on (MPO) fiber adapter comprising:
   an adapter housing containing a plurality of laser diodes, each laser diode configured to generate a laser emission based on an input signal of a focal plane array; and
   a laser mount configured to mate with an MPO connector having a plurality of fiber cores and direct each laser emission through to a corresponding fiber core of the MPO connector.

2. The MPO fiber adapter of claim 1, wherein each laser diode is mounted to a laser location within the laser mount for directing the laser emission to the corresponding fiber core of the MPO connector, each laser location being spaced a first distance from adjacent laser locations, the first distance equal to a second distance between fibers of the MPO connector.

3. The MPO fiber adapter of claim 1, wherein:
   the laser mount includes a first pin hole proximate a first edge and a second pin hole proximate a second edge opposite the first edge, the first pin hole positioned to align with a first guide pin of the MPO connector and the second pin hole positioned to align with a second guide pin on the MPO connector to align the MPO fiber adapter and the MPO connector; and
   the laser mount includes a plurality of laser locations between the first pin hole and the second pin hole, each laser location configured to direct one of the laser emissions to the corresponding fiber cores of the MPO connector.

4. The MPO fiber adapter of claim 3, wherein the laser locations are built-in channels within the laser mount.

5. A cryogenic laser transmitter comprising:
   a focal plane array;
   a cryogenic dewar containing the focal plane array and configured to cryogenically cool the focal plane array;
   a multi-fiber push-on (MPO) connector containing a plurality of fiber cores; and
   an MPO fiber adapter connected between the MPO connector and the focal plane array, the MPO fiber adapter including:
     an adapter housing containing a plurality of laser diodes, each laser diode configured to generate a laser emission based on an input signal from outputs of the focal plane array; and
     a laser mount configured to mate with the MPO connector and direct each laser emission to a corresponding fiber core of the MPO connector.

6. The cryogenic laser transmitter of claim 5, wherein each laser diode includes a laser location for directing the laser emission to the corresponding fiber core of the MPO connector, each laser location being spaced a first distance from adjacent laser locations, the first distance being equal to a second distance between fiber cores of the MPO connector.

7. The cryogenic laser transmitter of claim 6, wherein the laser locations are channels.

8. The cryogenic laser transmitter of claim 5, wherein:
   the laser mount includes a first pin hole proximate a first edge and a second pin hole proximate a second edge opposite the first edge, the first pin hole positioned to align with a first guide pin of the MPO connector and the second pin hole positioned to align with a second guide pin on the MPO connector to align the MPO fiber adapter and the MPO connector; and
   the laser mount includes a plurality of laser locations between the first pin hole and the second pin hole, each laser location configured to direct one of the laser emissions to the corresponding fiber core of the MPO connector.

9. The cryogenic laser transmitter of claim 5, wherein:
   the plurality of laser diodes include 6 separate laser diodes; and
   the MPO connector includes 12 fiber cores including 6 fiber cores aligning with the 6 separate laser diodes.

10. The cryogenic laser transmitter of claim 5, wherein the plurality of fiber cores are multimode fiber cores having a core diameter of substantially 50 micrometers.

11. The cryogenic laser transmitter of claim 5, wherein the plurality of fiber cores are multimode fiber cores having a core diameter of substantially 62 micrometers.

12. The cryogenic laser transmitter of claim 5, wherein each laser diode includes a circuit card with a bonding pad, the bonding pad configured to connect to a power source of the focal plane array to power said laser diode.

13. The cryogenic laser transmitter of claim 12, wherein the laser diodes are Fabry-Perot lasers.

14. The cryogenic laser transmitter of claim 5, wherein each laser diode is configured to operate at greater than 2 Gbps to transmit data from the input signal.

15. The cryogenic laser transmitter of claim 5, wherein the laser mount material is formed from a material with a thermal coefficient of expansion substantially between 20E-6 mm/mm/K and 90E-6 mm/mm/K.

16. The cryogenic laser transmitter of claim 5, wherein the laser mount material is aluminum.

17. The cryogenic laser transmitter of claim 5, wherein the focal plane array is a digital focal plane array.

* * * * *